June 30, 1959  J. J. INTINTOLO  2,892,306
AFTERBURNER FUEL CONTROL
Filed May 26, 1955

INVENTOR.
JOHN J. INTINTOLO
BY
ATTORNEYS

United States Patent Office 2,892,306
Patented June 30, 1959

2,892,306

AFTERBURNER FUEL CONTROL

John J. Intintolo, Philadelphia, Pa., assignor, by mesne assignments, to the United States of America as represented by the Secretary of the Navy Application May 26, 1955, Serial No. 511,443

1 Claim. (Cl. 60—35.6)

The present invention relates to a novel and improved turbo-jet engine or gas turbine having an afterburner as a means for effecting increased thrust. More specifically it relates to a novel and improved fuel control system for the afterburner of such an engine or turbine.

In the various types of turbo-jet and gas turbine engines that are used in aircraft propulsion systems and the like, it is often necessary and desirable to provide periodic increased amounts of thrust particularly during take-off and other specialized conditions of flight. For this reason a fuel injection system, which is auxiliary to the main fuel system for the main combustion chamber, is often provided rearwardly of the turbine for mixing controlled amounts of liquid fuel with the turbine discharge gases and for recombusting the mixture in the so-called reheater or afterburner. Although various types of fuel control systems have been provided in the past for such afterburning, considerable difficulty has been experienced heretofore in providing a system which though relatively simple in construction is sufficiently reliable and effective in operation.

It is a principal object of the present invention to provide a novel and improved fuel control system for the afterburner of a turbo-jet engine or gas turbine.

It is a further object of the present invention to provide a novel and improved fuel control system for an afterburner wherein the amount of added thrust produced may be conveniently adjusted and controlled.

It is a further object of the present invention to provide a novel and improved afterburner fuel control system wherein the supply of fuel to the afterburner manifolds may be positively cut off if the main fuel pump fails to shut down.

Other objects and many of the attendant advantages of this invention will be readily appreciated as the same becomes better understood by reference to the following detailed description when considered in connection with the accompanying drawing.

Figure 1:
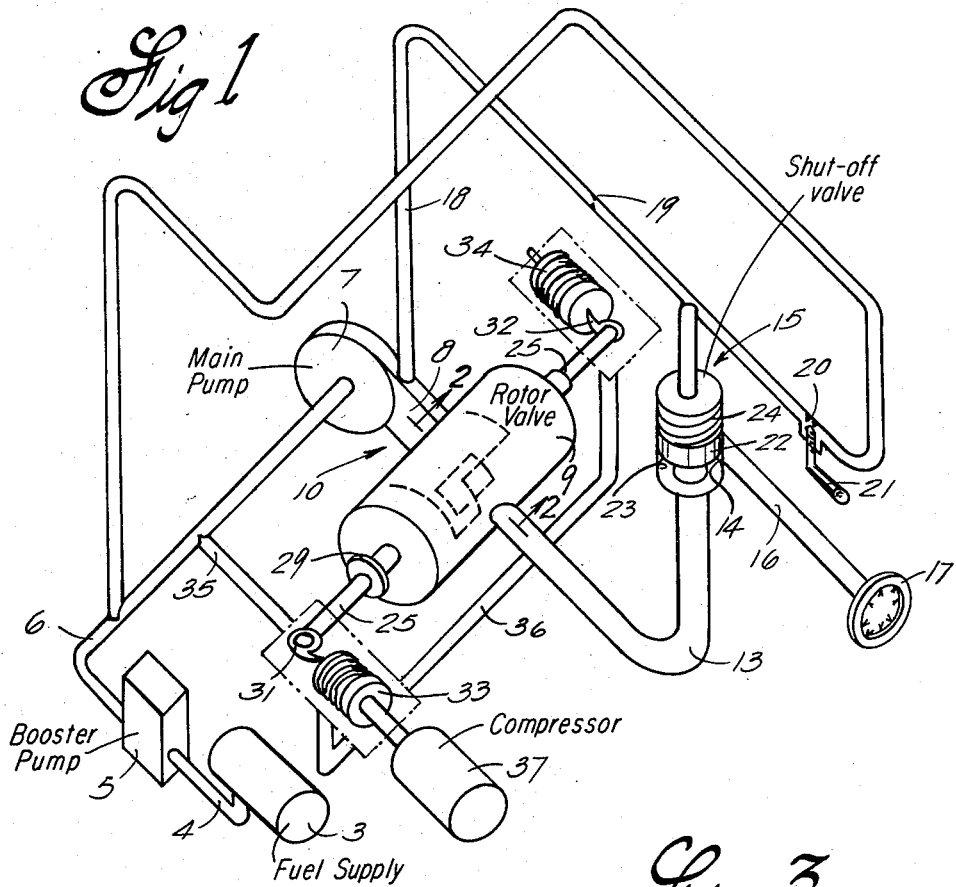
Figure 1 is a diagrammatic view of a preferred embodiment of the present invention.
Figures 2, 3:
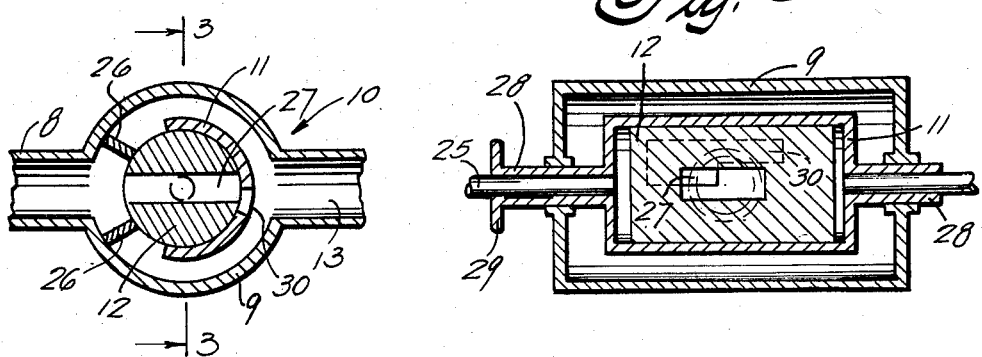
Figure 2 is a cross sectional view of the rotor valve taken along line 2—2 shown in Figure 1.
Figure 3 is a cross sectional view of the rotor valve as seen along reference line 3—3 in Figure 2.

A preferred embodiment of the present invention is shown in Figure 1 of the drawing. As shown therein, fuel is directed from the fuel tank 3, through conduit 4, the tank booster pump 5, and the conduit 6 to the main fuel pump 7 for the afterburner system. The pump 7 is preferably of the centrifugal type and though not shown in the drawing is preferably driven at a substantially constant rate in any suitable manner such as by means of the air compressor of the turbine or a suitable constant speed electric motor. The fuel on the discharge side of the pump 7 is then directed through the conduit 8 into the enclosed casing 9 of the rotor valve 10 and through the sleeve and rotor elements 11 and 12 of the valve, into conduit 13. The fuel then flows through conduit 13 past the orifice 14 defined and controlled by the balance and shut off valve 15 and through conduit 16 to the fuel rings 17 of the turbine afterburner wherein combustion is initiated and maintained.

Fuel on the discharge side of the main fuel pump 7 for the afterburner also passes through conduit 18 and through the orifices 19 and 20 disposed therein back to the input side of the pump 7. As shown in the drawing, the dimensions of the orifice 20 are controlled and adjusted in any suitable manner preferably by means of the control lever element or the like 21. In this way as will be more apparent hereinafter the magnitude of the added thrust, that is available due to combustion in the afterburner, may be conveniently and accurately controlled.

The balance and shut-off valve 15 of the fuel control system preferably takes the form of the piston or the like 22 which is adjustably positioned in the cylinder 23. The upper extremity of the cylinder is connected to conduit 18 between the orifices 19 and 20 therein whereas its lower extremity is connected to conduit 13. As will be more apparent hereinafter, the respective pressures on the upper and lower surfaces of piston 22 together with the pressure exerted by the relatively light spring 24 control and determine the position of the piston in its cylinder and the size of the opening or orifice 14 between conduits 13 and 16.

The cylindrical casing or the like 9, which forms the shell of the rotor valve 10, is preferably connected on diametrically opposite sides to the conduits 8 and 13. The reduced diameter cylindrical rotor element 12 is positioned within the casing 9 on the shaft 25 which extends through opposite extremities of the casing. The elongated flange members or the like 26 that extend inwardly from the internal periphery of the casing 9 engage the rotor element 12 and effect a fluid seal therewith in any suitable conventional manner, whereas the diametrically disposed rectangular opening 27 through the rotor element 12 provides a fluid path between opposite sides of the casing. The C-shaped sleeve member or the like 11 is preferably positioned as shown in the drawing about the periphery of the rotor element 12. The tubular shaft 28 on which the sleeve member is mounted is concentrically positioned about the shaft 25 and extends through opposite extremities of the casing 9 such that as will be more apparent hereinafter, the hand-wheel or the like 29 on at least one extremity thereof may be conveniently operated to control the axial and radial disposition of the step-shaped opening 30 in the sleeve member with respect to the rectangular opening 27 through the rotor element 12.

Opposite extremities of the shaft 25 are secured to the cam members or the like 31 and 32 with which the movable extremities of the bellows members 33 and 34 respectively make contact. As indicated in the drawing, gases from the discharge end of the air compressor 37 of the turbine are delivered into the interior of the bellows member 33 whereas conduit 35 provides a pressure upon its exterior surface which is substantially equal to the pressure of the fluid at the input of the main pump 7. The interior of the compensating bellows member 34 is evacuated and sealed as best as present methods will permit as shown and the conduit 36 provides a pressure on its exterior surface which is also substantially equal to the pressure of the fluid at the input of the pump 7.

In operation the fuel from the fuel tank 3 and the booster pump 5 is fed through the main fuel pump 7 where the fluid pressure is increased a predetermined substantially constant amount. The fuel then passes through the rectangular opening in the rotor element 12 of the valve 10 and past the orifice 14 of the balance and shut-off valve 15 to the fuel ring 17 in the afterburner of the engine. Discharge gases from the air compressor 37 enter the bellows element 33, rotates the rotor element 12, and varies the effective area of the rectangular opening 27 therein. In this way the flow of fuel to the afterburner may be varied lineally with the flow of air through the compressor. The effective area of the opening 27 through the rotor element 12 is also adjusted by respectively controlling the axial and radial disposition of the hand-wheel 29. The fuel flow for a jet afterburner responds to a calibration flow curve that has a slope and proper level for a particular desired thrust output. In the instant invention adjustment of C-shaped sleeve 11 provides for a particular setting. The slope of the calibration flow curve is achieved by the axial adjustment, and the proper level, by the radial adjustment. In this way the slope and proper level of the calibration flow curve are respectively controlled.

The power control lever 21 which defines the area of the orifice 20 provides a manual control of the amount of augmentation or added thrust that is developed in the afterburner. Thus, as the area of the orifice 20 is decreased, the pressure between orifices 19 and 20 increases to move the piston 22 of the balance and shut-off valve 15 toward a lower position in its cylinder 23. This reduces the flow of fuel through orifice 14 to the afterburner. When orifice 20 is entirely closed off by control lever 21, the pressure on the upper surface of piston 22 becomes substantially equal to the fuel discharge pressure of the main pump 7 and the pressure of the relatively light spring 24 completely closes off orifice 14 even through the pressure beneath the piston also becomes substantially equal to the discharge pressure of pump. Thus, in this condition no fuel is delivered to the afterburner manifolds.

The balance and shut-off valve 15 of the present fuel control system also automatically controls the flow of fuel to the afterburner when a coking condition develops about the fuel rings 17. Thus, when the fuel rings begin to clog or coke, the fuel pressure beneath the piston 22 of the valve increases and causes the piston to move upwardly thereby automatically compensating for the coking by increasing the flow of fuel through orifice 14 to the afterburner.

Thus, it is seen that the present afterburner fuel control system meets its various requirements by providing controlled augmentation of thrust, means for positively cutting-off the supply of fuel if the main pump fails to shut-down, control of fuel to the afterburner in accordance with the flow of air through the air compressor, and means for controlling the slope and flow adjustments of the flow calibration curve of the fuel control system.

Obviously many modifications and variations of the present invention are possible in the light of the above teachings. It is therefore to be understood that within the scope of the appended claims the invention may be practiced otherwise than as specifically described.

What is claimed is:

An afterburner fuel control system for a gas turbine having an air compressor, said system comprising a fuel source; a fuel pump; a rotor valve; a balance and shut-off valve; a fuel injection ring; means for conducting fuel from its source successively through the pump, the rotor valve, and the balance and shut-off valve to the fuel injection ring; means for bypassing fuel around the pump; means defining a pair of orifices in said pump bypass means; a control lever for adjustably controlling the dimensions of one of said orifices; means positioned between the pair of orifices responsive to the pressure of the fuel between the said pair of orifices for controlling the position of the balance and shut-off valve; and means responsive to the pressure of the air flow through the compressor for controlling the position of the rotor valve.

References Cited in the file of this patent
UNITED STATES PATENTS

| | | |
|---|---|---|
| 2,422,808 | Stokes | June 24, 1947 |
| 2,604,149 | Wynne | July 22, 1952 |
| 2,700,275 | Chandler | Jan. 25, 1955 |